United States Patent
Jamison

[11] 3,770,151
[45] Nov. 6, 1973

[54] FLUID PROPELLED MINE HAULAGE VEHICLE AND METHOD FOR UNDERGROUND HAULAGE

[75] Inventor: Will B. Jamison, Bethel Park, Pa.
[73] Assignee: Consolidation Coal Company, Pittsburgh, Pa.
[22] Filed: July 7, 1972
[21] Appl. No.: 269,521

Related U.S. Application Data
[62] Division of Ser. No. 158,829, July 1, 1971, Pat. No. 3,712,489.

[52] U.S. Cl. .............................................. 214/152
[51] Int. Cl. ............................................ B60p 1/38
[58] Field of Search .......................... 214/83.36, 152; 104/157; 105/65; 180/66 B, 54 C

[56] References Cited
UNITED STATES PATENTS
1,628,217  5/1927  Baum .................................... 105/65
3,262,513  7/1966  Henriksson et al ............... 180/54 C Primary Examiner—Albert J. Makay
Attorney—D. Leigh Fowler, Jr. et al.

[57] ABSTRACT

The underground mine haulage vehicle is particularly adapted for use as a shuttle vehicle between a continuously advancing loading station and a fixed discharge station to transport material dislodged by the continuous mining machine at the loading station to fixed conveying apparatus at the discharge station. The mine haulage vehicle has a mobile body with pairs of front and rear traction wheels. A fluid actuated motor is connected through suitable driving connections to the traction wheels. Accumulators having fluid under pressure therein are connected to the fluid actuated motor and the fluid under pressure from the accumulators actuates the fluid motor and propels the shuttle vehicle. The fluid circuit includes a fluid inlet connection to the accumulators and a fluid outlet connection from a reservoir. At a recharging station located adjacent to the fixed discharge station a suitable recharging device is provided for recirculating the fluid from the reservoir to the accumulators and compressing the gas in the accumulators to recharge the accumulators with fluid under pressure. Other embodiments include providing a pump on the haulage vehicle to transfer the fluid from the reservoir to the accumulators and recharing the accumulators with fluid under pressure A separate electric motor for the recharging pump is located adjacent the fixed discharge station and is connected thereto to energize the pump while the vehicle is discharging the dislodged material. In another embodiment the fluid actuated motor is also operable as a pump to transfer fluid from the reservoir to the accumulators. A separate circuit may be provided from the external recharging means to a drive motor for the conveyor so that the conveyor may be driven by the external recharging means while the fluid system is being repressurized.

1 Claim, 8 Drawing Figures

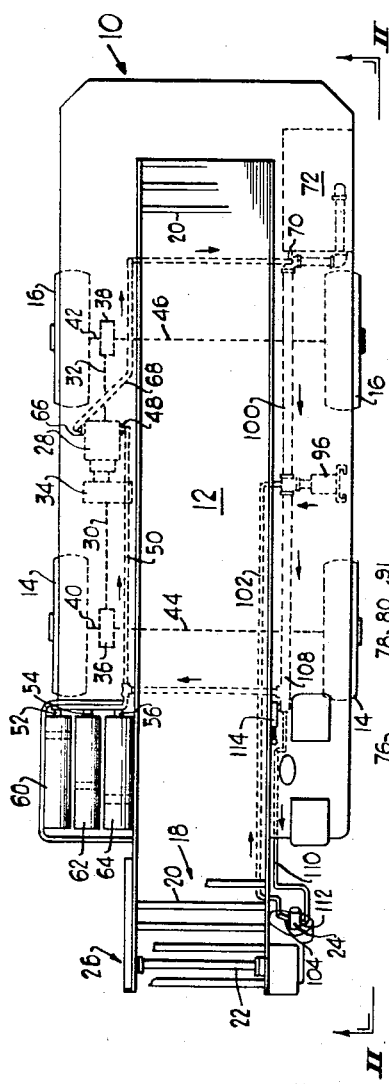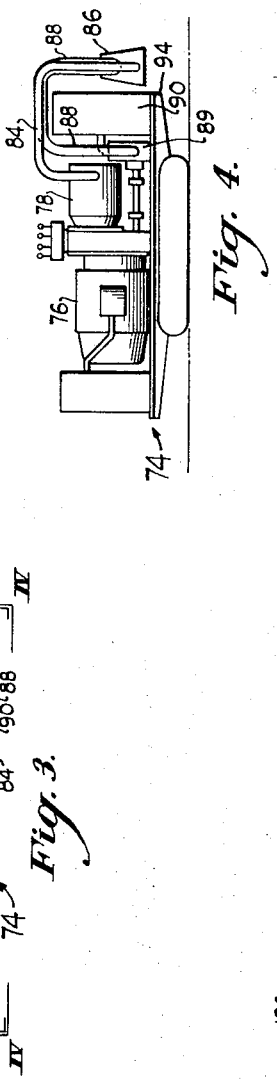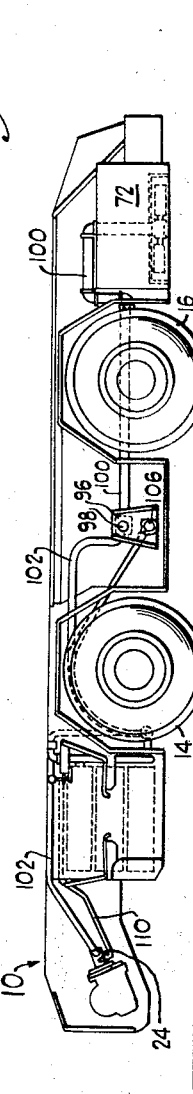

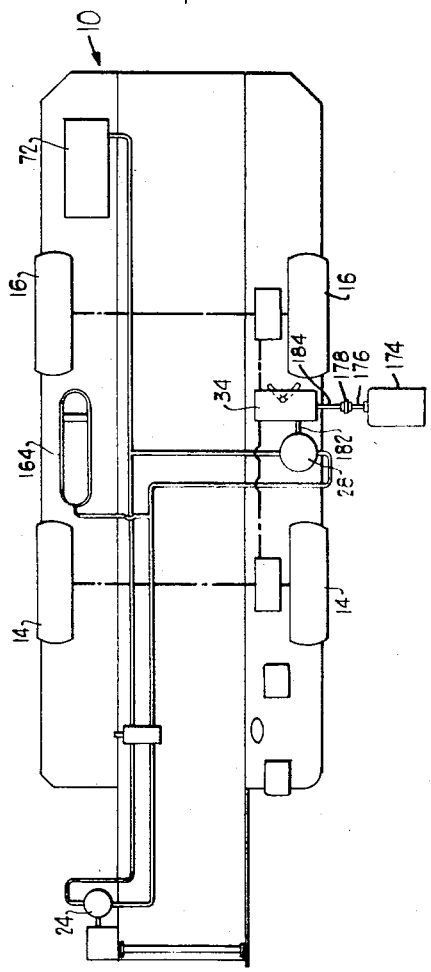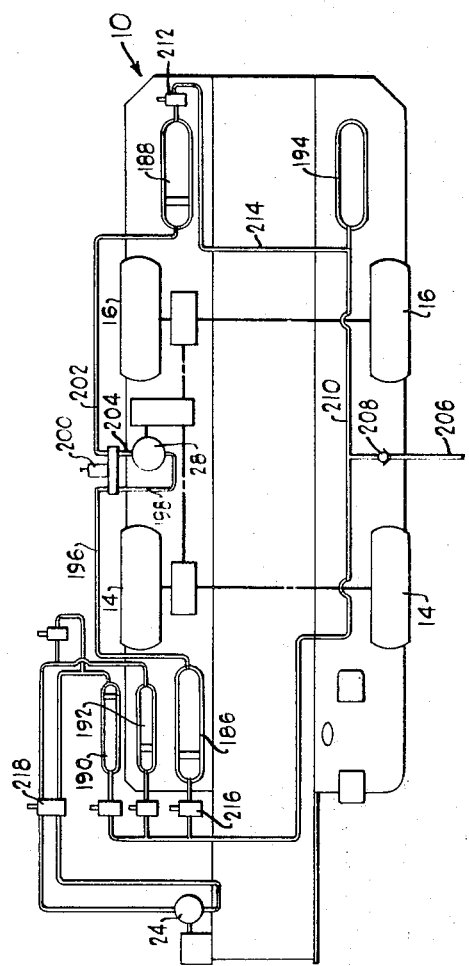

FLUID PROPELLED MINE HAULAGE VEHICLE AND METHOD FOR UNDERGROUND HAULAGE

CROSS-REFERENCE TO RELATED APPLICATION

This application is a division of U.S. Pat. application Ser. Number 158,829, filed July 1, 1971 now U.S. Pat. No. 3,712,489 entitled "FLUID PROPELLED MINE HAULAGE VEHICLE AND METHOD FOR UNDERGROUND HAULAGE".

BACKGROUND OF THE INVENTION

1. Field of the Invention

This invention relates to a fluid propelled haulage vehicle and method for underground haulage and more particularly to a fluid propelled haulage vehicle in which an external source of power is employed to pressurize the fluid.

2. Description of the Prior Art

Shuttle type mine haulage vehicles for use in underground haulage systems are well known. The conventional propulsion systems associated with the underground haulage vehicles are electric motors supplied with current through a trailing cable. U.S. Pat. Nos. 2,953,213 and 2,925,136 disclose haulage vehicles with a single electric motor to drive all of the traction wheels. The current is supplied to the electric motor through a cable wound on a cable reel mounted on the haulage vehicle. The cable is connected at its free end to a power supply usually located between the fixed conveying apparatus and the continuous mining machine. As the haulage vehicle shuttles between the mining machine and the fixed conveying apparatus, the cable is wound on and off the cable reel. The trailing cable is a source of inherent danger in underground mining operations and is frequently damaged by the mine haulage vehicles and other external sources. Trailing cables have, in the past, caused underground fires due to a cable parting while current is flowing therethrough.

In order to eliminate the inherent danger of the trailing cables, it has been proposed to provide internal combustion engines as illustrated in U.S. Pat. No. 3,067,830 as the propulsion means for the haulage vehicles. Internal combustion engines, however, discharge objectionable exhaust fumes and, even with elaborate scrubbing apparatus, have not been accepted for underground use in coal mines.

Another alternative that has been proposed is the use of storage batteries on the haulage vehicle. Because of the power requirements, the size of the storage batteries to carry a sufficient amount of electrical energy on the haulage vehicle for a working shift is not practical with the present day technology of storage batteries. Further, the batteries discharge relatively rapidly and require a slow recharging so that it is not practical to attempt to recharge the storage batteries during the haulage cycle.

There is a need, therefore, for a haulage vehicle propulsion means that will rapidly replace the energy used during one or more haulage cycles.

SUMMARY OF THE INVENTION

The hereinafter described invention includes a mine haulage vehicle that has a mobile body with a material haulage compartment. Pairs of front and rear wheels are arranged to propel the mine haulage vehicle and are connected by suitable driving connections to a fluid actuated drive means mounted on the mobile body. Fluid storage means are mounted on the vehicle and connected to the fluid actuated drive means. Pressure means are provided to convey the fluid under pressure from the fluid storage means to the fluid actuated drive means to drive the fluid actuated drive means and the traction wheels connected thereto. A fixed recharging means is connectable to the pressure means on the vehicle and is arranged to repressurize the fluid in the fluid storage means.

The haulage vehicle of this invention is thus propelled by fluid under pressure. The fluid under pressure is stored in suitable accumulators mounted on the haulage vehicle. A fixed recharging device is positioned adjacent the fixed conveying apparatus and is arranged to rapidly repressurize the fluid in the accumulators. In one species of the invention the pressurized fluid is exhausted from the fluid actuated drive motor into a reservoir. The recharging device includes a pump that transfers the fluid from the reservoir to the accumulator where the fluid is repressurized. In another embodiment of this invention the transfer pump is positioned on the haulage vehicle and is connected to a fixed, external power source at the fixed conveying apparatus. With this arrangement, the energy expended by the haulage vehicle in shuttling between the fixed conveying apparatus and the mining machine is rapidly replaced at the fixed conveying apparatus while the haulage vehicle is discharging the dislodged material from the haulage compartment onto the fixed conveying apparatus or a conveyor feeder located at the fixed discharge station. The method for underground haulage between a continuously advancing loading station and a fixed discharge station includes providing fluid under pressure to propel the haulage vehicle and recharging or repressurizing the fluid to a preselected pressure at the fixed discharge station.

Accordingly, the principal object of this invention is to provide a shuttle type haulage vehicle wherein the energy expended in transporting dislodged material from a mining machine to a fixed conveying apparatus is rapidly replaced while the haulage vehicle discharges the dislodged material from the haulage compartment.

Another object of this invention is to provide a haulage vehicle for use in underground mines that does not require a trailing cable or an internal combustion engine.

These and other objects and advantages of this invention will be more completely disclosed and described in the following specification, the accompanying drawings and the appended claims.

BRIEF DESCRIPTION OF THE DRAWINGS

FIG. 1 is a schematic top plan view of a mine haulage vehicle illustrating schematically portions of the drive train for the traction wheels and the circuit for the pressurized propelling fluid.

FIG. 2 is a view in side elevation of the haulage vehicle of FIG. 1 taken along the line II—II and illustrating the coupling mechanism of the recharging apparatus.

FIG. 3 is a top plan view of the fluid pressure recharging apparatus.

FIG. 4 is a view in side elevation taken along the line IV—IV of FIG. 3.

FIG. 7 is a schematic plan view of another embodiment of the fluid propelled haulage vehicle in which the fluid actuated drive includes a pump for transferring the fluid from the reservoir to the accumulator.

FIG. 8 is a top plan view of a fluid propelled hydraulic vehicle similar to FIG. 1 illustrating another embodiment in which the fluid is transferred from one accumulator to another and gas under pressure is supplied to the fluid system at the recharging station.

Figure 5:
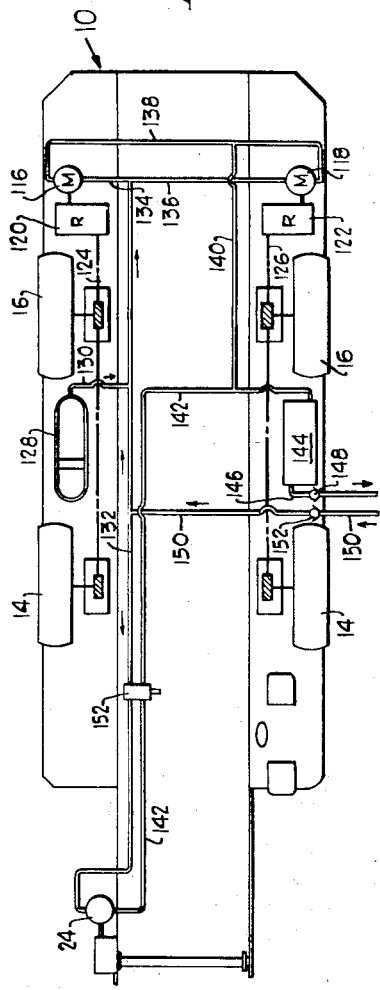
FIG. 5 is a schematic top plan view similar to FIG. 1 illustrating another embodiment of the fluid propulsion apparatus for the haulage vehicle.

The several features of the invention as illustrated in the drawings are embodied in a mine haulage vehicle commonly referred to as a "shuttle car" designed for use in transferring dislodged material in underground mines. Reference may be made to U. S. Pat. No. 2,925,136 for a complete description of the vehicle construction.

DESCRIPTION OF THE PREFERRED EMBODIMENTS

The mine haulage vehicle includes a mobile body generally designated by the numeral 10. There is a longitudinal centrally located material haulage compartment 12 in the body portion. The mobile body 10 is mounted on pairs of traction wheels 14 and 16 that are preferably both traction and steering wheels. An endless conveyor generally designated by the numeral 18 extends along the bottom of the haulage compartment and includes side chains to which transverse conveyor flights 20 are connected. The side chains are suitably connected to sprockets mounted on transverse end shaft 22. The shaft 22 is, in turn, driven by a hydraulic motor 24 so that upon rotation of shaft 22 the endless conveyor 18 moves along the bottom of the material haulage compartment 12 and discharges the dislodged material therefrom. Although not illustrated in detail, the body portion 10 includes a tiltable boom member 26 which is arranged to pivot and vary the height of the endless conveyor 18 while discharging dislodged material therefrom. Suitable controls are provided to pivot the boom member 26.

In FIG. 1 pairs of wheels 14 and 16 are driven by a fluid actuated motor generally designated by the numeral 28. A pair of longitudinal output shafts 30 and 32 are connected to a gear type reducer 34 which, in turn, has its input shaft connected to the output shaft of the fluid actuated motor 28. The shafts 30 and 32 are connected to differentials 36 and 38 adjacent the wheels 14 and 16 on one side of the haulage vehicle. Shafts 40 and 42 connect the outputs of differentials 36 and 38 to the adjacent wheels 14 and 16. Transverse shafts 44 and 46 extend from the differentials 36 and 38 beneath the haulage compartment to the wheels 14 and 16 on the opposite side of the haulage vehicle. With this arrangement, a single prime mover, i.e., the fluid actuated motor 28 provides tractive forces for all of the wheels 14 and 16 through the previously described driving connections.

The fluid actuated motor 28 may be any suitable hydraulic motor that is capable of converting hydrodynamic energy into mechanical energy for propelling the haulage vehicle at desired preselected speeds. For example, it has been found that a variable volume type fluid motor manufactured by the Sunstrand Corporation and designated Number 24 Series having a displacement of 7.24 cubic inch per revolution has been found suitable. The variable volume fluid motor includes a wobble or swash plate that is manually positioned. The angle of the swash plate determines the volume of oil displaced and in turn controls the speed of the vehicle. The swash plate construction permits reversal in direction of the output shaft so that the vehicle may be propelled in either the forward or reverse direction by the fluid actuated motor 28. The speed of the fluid actuated motor is related to and regulated by the torque demand on the motor. The speed and torque is regulated by the cam and swash or wobble plate. The fluid actuated motor can be reversed to provide regenerative hydraulic braking for the vehicle by functioning as a pump and pumping oil into the accumulators. It is believed that the fluid actuated motor is more efficient than a conventional DC electric motor because of the absence of line resistance in the hydraulic circuit. It should be understood, however, that other suitable fluid motor devices actuated by fluid under pressure may be employed. A unidirectional motor may be employed with a mechanical transmission for controlling both direction and speed. For example, the transmission employed in the haulage vehicle illustrated and described in U. S. Pat. No. 2,925,136 may be employed with a unidirectional fluid actuated motor.

The motor 28 has a inlet 48 connected to a fluid conduit 50. The conduit 50 is, in turn, connected to the outlets 52, 54 and 56 of accumulators 60, 62 and 64. The accumulators 60, 62 and 64 are of conventional construction in which there is an expandable diaphragm separating a gas chamber from a fluid chamber. The accumulators 60, 62 and 64 may also be of the free piston type. Although only three accumulators are illustrated, it should be understood that a greater number or lesser number may be employed depending on the desired amount of fluid that it is intended to store under pressure. When fluid is pumped into the accumulators 60, 62 and 64, the gas in the gas chamber portion of the accumulators is compressed to exert a pressure on the fluid within the accumulators. The fluid under pressure from the gas within the accumulators 60, 62 and 64 flows through conduit 50 to the inlet 48 of fluid motor 28. The fluid motor 28 has an outlet 66 to which outlet conduit 68 is connected. The fluid discharged from the motor 28 flows through conduit 68 to an inlet 70 of reservoir 72. Thus the fluid stored under pressure in accumulators 60, 62 and 64 flows through conduit 50 to motor 28 where the fluid pressure is converted to mechanical energy and the fluid flows from motor 28 through conduit 68 to reservoir 72 which is vented to the atmosphere.

To replace the energy dissipated by the fluid in propelling the haulage vehicle, there is provided a recharging device generally designated by the numeral 74 illustrated in FIGS. 3 and 4. The recharging device 74 may be mounted on suitable propelling devices as, for example, endless tracks and is preferably positioned adjacent to the fixed conveying apparatus. The recharging device 74 is connectable at that location to the fluid circuit of the haulage vehicle as later described to replace the energy expended during the haulage cycle. The recharging is done while the haulage vehicle is discharging dislodged material therefrom at the discharge station. The recharging device 74 includes an electric motor 76 connected to a high output positive displacement pump 78. The pump 78 has a fluid inlet 80 and a fluid outlet 82 as illustrated in FIGS. 3 and 4. An outlet conduit 84 is connected at one end to the pump outlet 82 and at the other end to a coupling 86. An inlet conduit 88 is connected at one end to the coupling 86 and at the other end to a pump 89. The pump 89 is, in turn, connected to a tank or reservoir 90. The tank outlet is connected by a conduit 91 to a priming pump 93. The priming pump is connected by a conduit 92 to the inlet of output pump 78. With this arrangement the motor 76 is arranged to transfer approximately 130 gallons per minute of fluid from the inlet conduit 88 to the outlet conduit 84 through an auxiliary pump 89, reservoir 90 and priming pump 93. The coupling 86 and the conduits associated therewith are movable transversely on the recharging device body portion 94 and are also arranged to move vertically thereon.

Referring again to the haulage vehicle 10, there is a female coupling 96 that has an outlet 98 with a suitable check valve therein connected to conduits 100 and 102. The conduit 100 extends into the reservoir 72 and terminates adjacent the bottom portion thereof. The conduit 102 is connected to the outlet port 104 of hydraulic motor 24. The female coupling 96 on the haulage vehicle 10 has an inlet port 106 with a suitable one-way check valve therein. The inlet port 106 is, in turn, connected to conduit 108 that is arranged to convey fluid into the accumulators 60, 62 and 64 from the coupling 96. There is provided a branch conduit 110 connected at one end to the conduit 108 and at the other end to the inlet port 112 of conveyor drive motor 24. A manually operable valve 114 is positioned in branch conduit 110 and is arranged to control the flow of fluid therethrough.

OPERATION

The above described fluid propelled haulage vehicle 10 may be operated in the following manner. The gas in accumulators 60, 62 and 64 is displaced by a fluid, preferably a liquid, for example, hydraulic fluid so that the fluid within accumulators 60, 62 and 64 is under a preselected pressure as, for example, a pressure between 2,000 and 5,000 lbs. per square inch. The pressure and volume of fluid is dependent on the energy required to propel the shuttle car for one or more cycles. Controls are provided to control the flow of pressurized fluid through the fluid actuated motor 28 and control the output of motor 28 for attaining a preselected speed with the shuttle car. The rotation of the output shaft of motor 28 is transmitted through gear type reducer 34 to the traction wheels 14 and 16. The fluid exhausted from the motor 28 flows through outlet 66 into outlet conduit 68. The fluid is discharged from conduit 68 into reservoir 72 that is vented to atmosphere.

After the haulage vehicle 10 has traveled to the continuous mining machine and the material haulage compartment is filled with dislodged material, the shuttle car is propelled by the fluid under pressure to the discharge station where the fixed conveyor apparatus is located. At the discharge station the haulage vehicle 10 is stopped adjacent to the recharging device 74 as illustrated in FIGS. 3 and 4. Suitable controls are provided on the recharging device 74 to move the coupling 86 toward the female coupling 96 on the haulage vehicle 10. When the interface portions of the couplings are aligned vertically, the coupling device 86 is moved upwardly and connected to the female coupling 96 on the haulage vehicle 10. The motor 76 is energized to withdraw the fluid from the reservoir 72 through conduit 100 and to convey the same fluid under pressure through conduit 108 to the accumulators 60, 62 and 64 where the fluid displaces the gas within the accumulators 60, 62 and 64 and the gas under pressure again exerts a pressure on the fluid.

Simultaneously, a portion of the fluid flowing through conduit 108 is diverted by means of valve 114 into conduit 110 to drive the conveyor hydraulic motor 24 and thus actuate the endless conveyor 18 and discharge the dislodged material from the haulage vehicle while the accumulators 60, 62 and 64 are being recharged with fluid. The fluid exhausted from hydraulic conveyor motor 24 flows through conduit 102 through fluid inlet 98 to the recharging device 74.

With this arrangement the energy required to actuate the endless conveyor 18 for discharging the dislodged material from the haulage compartment is provided by the recharging device 74 while the accumulators 60, 62 and 64 are being recharged with hydraulic fluid. It is now possible with the above described apparatus to quickly and efficiently provide the energy required to propel a mine haulage vehicle from a discharge station to a loading station while the haulage vehicle is stopped and dislodged material is being discharged therefrom. The time cycle for transporting the dislodged material from the loading station to the discharge station is not increased by the recharging because a short period of time is required to unload the vehicle at the discharge station. It is during that period of time that the fluid propulsion system is recharged with fluid energy sufficient to propel the vehicle at the desired preselected speeds between the discharge station and the loading station where another load of the dislodged material is taken on by the haulage vehicle and transported from the loading station to the discharge station.

Referring now to FIGS. 5–8, other embodiments of the circuits for the fluid propelled haulage vehicles are illustrated. Similar parts will be designated by similar numerals for each of the embodiments illustrated in FIGS. 5–8.

Referring to FIG. 5, there are provided a pair of fluid motors 116 and 118 mounted on opposite sides of the haulage vehicle 10. The motors 116 and 118 are connected through reducers 120 and 122 to driving connections 124 and 126. The driving connections 124 are arranged to drive the wheels 14 and 16 on one side of the haulage vehicle and the driving connections 126 are arranged to drive the wheels 14 and 16 on the opposite side of the vehicle. Fluid under pressure is supplied to the motors 116 and 118 from accumulator 128 positioned between the wheels 14 and 16. The fluid under pressure flows through conduit 130 to conduit 132. The conduit 132 is connected to branch conduits 134 and 136. The inlets of motors 116 and 118 are, in turn, connected to branch conduits 134 and 136. The outlets of motors 116 and 118 are connected to the ends of conduit 138. Intermediate the end portions of conduit 138 there is a branch conduit 140 that is connected to conduit 142 and conduit 142 conveys the fluid from motors 116 and 118 into the reservoir 144. The conveyor motor 24 has the conduit 142 connected thereto to convey the fluid from the conveyor drive motor 24 to the reservoir 144. The reservoir 144 has a suitable outlet conduit 146 with a check valve 148 therein. The conduit 146 is arranged to be connected to the inlet conduit 88 of recharging device 74 previously described. The accumulator 128 is recharged with fluid through conduit 150 that has a check valve 152 therein. Fluid is conveyed from the recharging device 74 through conduit 150 to conduit 132 and through conduit 130 into the accumulator 128. Fluid from conduit 150 flows through conduit 132 when valve 152 is opened to provide fluid for conveyor drive motor 24 to actuate the endless conveyor 18, dislodging the material therefrom. It should be noted in both of the embodiments illustrated in FIGS. 1 and 5 that suitable circuitry is provided to actuate the conveyor drive motor 24 by the pressurized fluid in the accumulators 60, 62 and 64. With the above arrangement a pair of motors 116 and 118 are provided to drive the pairs of traction wheels on opposite sides of the haulage vehicle 10 and the manner of recharging the accumulator 128 is similar to that previously described in reference to the embodiment illustrated in FIGS. 1-4.

Figure 6:
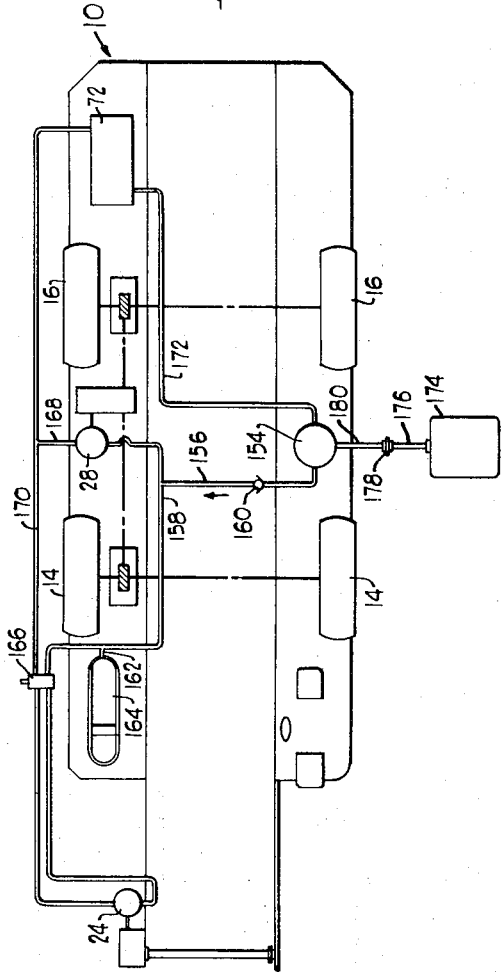
FIG. 6 is a schematic top plan view of another embodiment of the fluid propelled haulage vehicle in which the fluid transfer pump is positioned on the haulage vehicle.

Referring to FIG. 6 there is illustrated another embodiment of the haulage vehicle which includes a recharging pump 154 mounted on the haulage vehicle. A conduit 156 is connected at one end to the outlet of pump 154 and at the other end to a branch conduit 158. There is a check valve 160 in the conduit 156 to limit the flow of fluid to the direction indicated by the arrow. The conduit 156 has a branch conduit 162 that connects the conduit 158 to the fluid side of the accumulator 164. The conduit 158 is also connected through valve 166 to the conveyor motor 24. The conduit 158 also connects the inlet of motor 28 with the branch conduit 162 and the fluid side of accumulator 164 so that fluid under pressure flows from accumulator 164 to the inlet of motor 28. The outlet of motor 28 is connected by means of branch conduit 168 to a main return conduit 170. The return conduit 170 is also connected to the outlet of conveyor motor 24 and to the reservoir 72. An outlet from reservoir 72 is connected by means of conduit 172 to the inlet of pump 154. The drive arrangement for the propelling wheels 14 and 16 in FIG. 6 is substantially the same as that illustrated in FIG. 1.

At the discharge station there is an electric recharging motor 174 that has an output shaft 176 connectible through a flexible coupling 178 to an input shaft 180 of recharging pump 154. With the above arrangement the haulage vehicle 10 as it arrives at the discharge station has the recharging motor 174 coupled to the recharging pump 154 for recharging or repressurizing the fluid circuit. The motor 174 is energized to withdraw fluid from the reservoir 72 and to convey the fluid to the accumulator 164 where the fluid displaces the gas within the accumulator 164 and repressurizes the circuit. Both the recharging pump 154 and output pump 78 in FIGS. 3 and 4 are preferably positive displacement pumps arranged to positively displace the fluid supplied thereto to the oil side of the accumulators. With the above arrangement the recharging apparatus includes a positive displacement recharging pump 154 mounted on the haulage vehicle and connected in the fluid circuit. An actuating means for the recharging pump 154, preferably an electric recharging motor 174, is located at the discharge station. While the vehicle is discharging the dislodged material from the haulage compartment 12, the electric recharging motor 174 is connected to the positive displacement recharging pump 154 on the haulage vehicle. Actuation of the recharging motor 174 then recharges the accumulator 164 with the fluid to pressurize the same.

Referring to FIG. 7 another embodiment of the fluid propelled haulage vehicle 10 is illustrated. In this embodiment the gear type reducer 34 has suitable gearing and clutches to disconnect the reducer from the propelling wheel drive train to permit the input shaft 182 to serve as an output shaft and drive the fluid actuated motor 28 as a pump to function in a manner similar to the positive displacement recharging pump 154 in the embodiment illustrated in FIG. 6. The output shaft 176 of electric motor 174 is connected through coupling 178 to a shaft 184 extending from reducer 34 that serves as an input shaft during the recharging of the fluid system. The electric motor 174 through shafts 176 and 184 and the gearing within reducer 34, rotates shaft 182 to, in turn, drive the pump-motor 28 as a pump and recirculate fluid from the reservoir 72 to the accumulator 164. The circuit for the fluid is similar to and operates in substantially the same manner as the circuit previously described with reference to the embodiment illustrated in FIG. 6. The drive arrangement for the propelling wheels 14 and 16 in FIG. 7 is substantially the same as that illustrated in FIGS. 1 and 6.

Now referring to FIG. 8 there is illustrated another embodiment of the fluid propelled haulage vehicle in which the gas side of the accumulators is charged with gas under pressure to increase the fluid pressure on the opposite side of the diaphragm within the accumulator. The hydraulic fluid within the system is transferred from one accumulator through the fluid actuated motor to a second accumulator. The accumulator receiving the exhausted fluid is vented to the atmosphere. To recharge the system gas under pressure is supplied to the vented portion of the accumulator containing the fluid to pressurize the fluid within the recharged accumulator.

Referring now to FIG. 8 there are a pair of accumulators 186 and 188 associated with the fluid actuated drive motor 28. Another pair of accumulators 190 and 192 are associated with the conveyor drive motor 24. There is also provided a tank 194 for storage of gas under pressure. The accumulator 186 is connected to the motor 28 by a conduit 196 and branch conduit 198 on the opposite side of a reversing valve 200. The accumulator 188 is connected to the motor 28 by conduit 202 and branch conduit 204 on the opposite side of reversing valve 200. Depending on the position of the reversing valve 200, fluid under pressure may flow from either accumulator 186 or 188 through the conduits associated therewith to the input side of the motor 28. The output side of the motor is connected through the reversing valve 200 and respective conduits to the other of the associated accumulators. With this arrangement, for example when fluid under pressure is in accumulator 186, it flows through conduit 196, valve 200, and conduit 198 to the input of fluid actuated motor 28. The fluid flows from fluid actuated motor 28 through conduit 204, valve 200 and conduit 202 to the oil side of accumulator 188. The gas side of accumulator 188 has been vented to atmosphere through valve 212 and thus provides a reservoir for the fluid displaced from accumulator 186. When the fluid system is to be recharged, gas under pressure flows through conduit 206 at the fixed discharge station through check valve 208 on the vehicle to conduit 210. Assuming that accumulator 188 is filled with fluid, the valve 212 in conduit 214 is opened to permit gas under pressure to flow into the gas side of the accumulator to pressurize the fluid therein. At the same time, the valve 216 associated with accumulator 186 is closed and the gas side of accumulator 186 is vented to atmosphere. The gas storage tank 194 is also pressurized through conduit 210 to maintain a pressure within conduits 214 and 210 that communicate with the gas side of both accumulators 186 and 188 and the gas storage tank 194. To utilize the fluid under pressure in accumulator 188, the valve 200 is reversed and the fluid under pressure flows through conduit 202, valve 200 and conduit 198 to the inlet of motor 28. The fluid flows from fluid actuated motor 28 through conduit 204, valve 200 and conduit 196 to the accumulator 186. With this cycle the gas side of accumulator 186 is vented to atmosphere to permit the accumulator 186 to serve as a reservoir. On recharging the vehicle 10 at the discharge station the valve 216 is open to permit gas under pressure to flow into the gas side of accumulator 186 and pressurize the fluid therein. Additional gas under pressure is provided from tank 194 and may be connected to the gas side of the accumulator containing the oil under pressure therein.

The accumulators 190 and 192 are similarly connected to conveyor drive motor 24 through a reversing valve 218 and function in a manner similar to the previously described pair of accumulators 186 and 188. The drive arrangement for the propelling wheels 14 and 16 is substantially the same as that previously described with reference to FIGS. 1 and 6.

It will be appreciated with the previously described embodiments that it is now possible to transport material under ground with a haulage vehicle that utilizes fluid under pressure as the propelling medium. The fluid may be repressurized at the fixed discharge station by either recycling the fluid from a reservoir through an external pump mounted on the recharging device or through a pump mounted on the haulage vehicle. Further, a gas may be employed as the recharging medium to repressurize the fluid in the accumulators.

According to the provisions of the patent statutes, the principle, preferred construction and mode of operation of the invention have been explained and what is considered to represent its best embodiment has been illustrated and described. However, it should be understood that, within the scope of the appended claims, the invention may be practiced otherwise than as specifically illustrated and described.

I claim:

1. A method for underground haulage between a fixed discharge station and a continuously advancing loading station comprising, charging a haulage vehicle adjacent said fixed discharge station with propelling fluid under pressure to propel said haulage vehicle for at least one haulage cycle between said continuously advancing loading station and said fixed discharge station for transporting dislodged material on said haulage vehicle from said continuously advancing loading station to said fixed discharge station, propelling said vehicle with said propelling fluid under pressure to said continuously advancing loading station, loading said haulage vehicle with dislodged material at said continuously advancing loading station, propelling said haulage vehicle with said pressurized propelling fluid from said continuously advancing loading station to said fixed discharge station, and unloading said vehicle at said fixed discharge station by providing said haulage vehicle with propelling fluid under pressure at said fixed discharge station to drive load discharging apparatus on said haulage vehicle to discharge said load of dislodged material from said haulage vehicle at said fixed discharge station and simultaneously recharging said haulage vehicle with pressurized propelling fluid to propel said haulage vehicle for at least one haulage cycle.

* * * * *